(12) United States Patent
Evans

(10) Patent No.: US 9,493,100 B2
(45) Date of Patent: Nov. 15, 2016

(54) CHAIR FOR USE IN A VEHICLE

(71) Applicant: The Boeing Company, Seal Beach, CA (US)

(72) Inventor: Joseph Wilbur Evans, Houston, TX (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 13/953,187

(22) Filed: Jul. 29, 2013

(65) Prior Publication Data

US 2015/0028642 A1 Jan. 29, 2015

(51) Int. Cl.
*B60N 2/68* (2006.01)
*B64D 11/06* (2006.01)
*B60N 2/34* (2006.01)
*B60N 2/44* (2006.01)

(52) U.S. Cl.
CPC . *B60N 2/68* (2013.01); *B60N 2/34* (2013.01); *B60N 2/4495* (2013.01); *B64D 11/0607* (2014.12); *B64D 11/0641* (2014.12); *B64D 11/0642* (2014.12); *B64D 11/0643* (2014.12); *Y10T 29/4984* (2015.01); *Y10T 29/49826* (2015.01)

(58) Field of Classification Search
None
See application file for complete search history.

(56) References Cited

U.S. PATENT DOCUMENTS

| | | | |
|---|---|---|---|
| 5,104,189 A * | 4/1992 | Hanai et al. ................ | 297/284.4 |
| 5,556,163 A | 9/1996 | Rogers, III et al. | |
| 5,558,399 A * | 9/1996 | Serber ........................ | 297/284.4 |
| 5,564,780 A * | 10/1996 | Presser ................ | B60N 2/2878 297/238 |
| 5,568,959 A * | 10/1996 | Weber .................. | B60N 2/4613 297/238 |
| 5,588,700 A * | 12/1996 | Homier ................ | B60N 2/3084 297/14 |
| 5,662,377 A * | 9/1997 | Holdampf ............ | B60N 2/3013 297/14 |
| 5,992,798 A * | 11/1999 | Ferry .................... | A47C 1/0352 105/316 |
| 6,059,364 A * | 5/2000 | Dryburgh ............. | A47C 1/0352 105/322 |
| 6,170,786 B1 * | 1/2001 | Park ..................... | B60N 2/0232 248/274.1 |
| 6,382,725 B1 * | 5/2002 | Carroll ......................... | 297/330 |
| 6,663,174 B2 * | 12/2003 | Drage .................. | B60N 2/3084 297/112 |
| 7,523,888 B2 * | 4/2009 | Ferry et al. ................ | 244/118.6 |
| 8,484,773 B2 * | 7/2013 | Blevins ................ | A61G 7/1007 5/613 |
| 2001/0000639 A1 * | 5/2001 | Park ..................... | A47C 1/0352 297/411.3 |
| 2001/0008028 A1 * | 7/2001 | Blevins .................. | A61G 5/006 5/613 |
| 2003/0080597 A1 * | 5/2003 | Beroth ................. | A47C 1/0352 297/330 |
| 2004/0133979 A1 * | 7/2004 | Newkirk ............ | A61G 13/0036 5/600 |
| 2004/0152572 A1 * | 8/2004 | Reitz et al. .................... | 482/140 |
| 2009/0152916 A1 * | 6/2009 | Lin et al. .................... | 297/217.3 |
| 2009/0195040 A1 | 8/2009 | Birkbeck | |
| 2010/0201172 A1 * | 8/2010 | Hudswell ............... | B64D 11/06 297/340 |
| 2015/0084386 A1 * | 3/2015 | Hellman .................. | A47C 4/54 297/188.08 |

OTHER PUBLICATIONS

Back Store, New Silhouette Perfect Chair Zero Gravity Recliner from Human Touch, www.backstore.com, retrieved Jul. 29, 2013, pp. 5.

(Continued)

*Primary Examiner* — David E Allred
(74) *Attorney, Agent, or Firm* — Armstrong Teasdale LLP

(57) ABSTRACT

A chair for use with a vehicle is provided. The chair includes a base and a chair assembly slidably coupled to the base. The chair assembly includes a support frame, a seat coupled to the support frame, an upper back support coupled to the support frame, and a lower back support coupled to the support frame and independently rotatable with respect to the upper back support.

13 Claims, 7 Drawing Sheets

(56) References Cited

OTHER PUBLICATIONS

Evolution health.com, PC-095 Classic Power Perfect Chair Zero-Gravity Recliner, www.evolutionhealth.com, retrieved May 15, 2013, pp. 2.

Inada Living Furniture, Inada Doctor's Chair (3A) Massage Chair, www.inadacanada.com. retrieved May 15, 2013, pp. 2.

Uhuru Furniture & Collectibles, Homedics Inversion Massage Chair, uhurufurniture.blogspot.com, retrieved May 15, 2013, pp. 20.

Fitness Zone, Health Mark Core Inversion Chair, www.fitnesszone.com, retrieved May 16, 2013, pp. 2.

Emassagechair, Fujita KN9003 Zero Gravity Massage Chair, www.emassagechair.com, retrieved May 15, 2013, pp. 4.

NYC Aviation, United 787 Business First seat, www.nycaviation.com, retrieved May 16, 2013, pp. 13.

Knovelty, Infinity IT9800 Massage Chair, www.knovelty.com, retrieved May 15, 2013, pp. 4.

Boarding Area, LOT announces 787 schedule and unveils new business class product, boardingarea.com, retrieved May 16, 2013, pp. 7.

* cited by examiner

CHAIR FOR USE IN A VEHICLE

BACKGROUND

The present disclosure relates generally to a chair, and more particularly, to a self-therapeutic chair for use in a vehicle.

During travel, passengers often feel discomfort due to their travels. In long duration and/or distance trips, uncomfortable seating can often intensify an already uncomfortable situation. For example, flights can create passenger issues relating to safety, hunger, dehydration, light intensity, noise, and/or exhaustion. Additionally, a passenger may experience physical discomfort due to compression on a passenger's spine. This physical discomfort may remain unresolved during air travel as space for standing and/or stretching is often limited. Accordingly, the pain and/or discomfort experienced during travel may urge some passengers to forego travel.

BRIEF SUMMARY

In one aspect, a chair for use with a vehicle is provided. The chair includes a base and a chair assembly slidably coupled to the base. The chair assembly includes a support frame, a seat coupled to the support frame, an upper back support coupled to the support frame, and a lower back support coupled to the support frame and independently rotatable with respect to the upper back support.

In another aspect, an aircraft including a plurality of chairs is provided. The aircraft includes a first chair and a second chair configured to move between a first position, a second position, and a third position, wherein the second chair extends to the first chair when the second chair is in the third position. The second chair includes a base and a chair assembly slidably coupled to the base. The chair assembly includes a support frame, a seat coupled to the support frame, an upper back support coupled to the support frame, and a lower back support coupled to the support frame and independently rotatable with respect to the upper back support.

In yet another aspect, a method of fabricating a chair for use in a vehicle is provided. The method includes providing a support frame, coupling a seat to the support frame, coupling an upper back support to the support frame, and coupling a lower back support to the support frame, wherein the lower back support is independently rotatable with respect to the upper back support.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to a chair and, more particularly, to a self-therapeutic chair for use in a vehicle. In one embodiment, the chair includes a base and a chair assembly slidably coupled to the base. The chair assembly includes a support frame, a seat coupled to the support frame, an upper back support coupled to the support frame, and a lower back support coupled to the support frame and independently rotatable with respect to the upper back support. Accordingly, the chair may enable a passenger to stretch at least one of a lower back and/or a spine of the passenger while in the chair.

The systems and methods described herein enable a user to provide self-therapy while in a chair of a vehicle. As used herein, the term "vehicle" refers to any mobile machine capable of transporting passengers and/or cargo. As used herein "vehicle" includes, but is not limited to only including, automobiles (e.g., car, bus, and truck), watercraft, sailcraft, aircraft, and spacecraft. While the following description references an aircraft, it should be appreciated that the subject matter described herein may be applicable to any environment. For example, the subject matter described herein could just as readily be applied to a chair or seat in an automobile, or a chair used in a home environment. Accordingly, any reference to "aircraft" throughout the following description is merely meant to illustrate one potential application of the teachings of the subject matter described herein.

As used herein, an element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
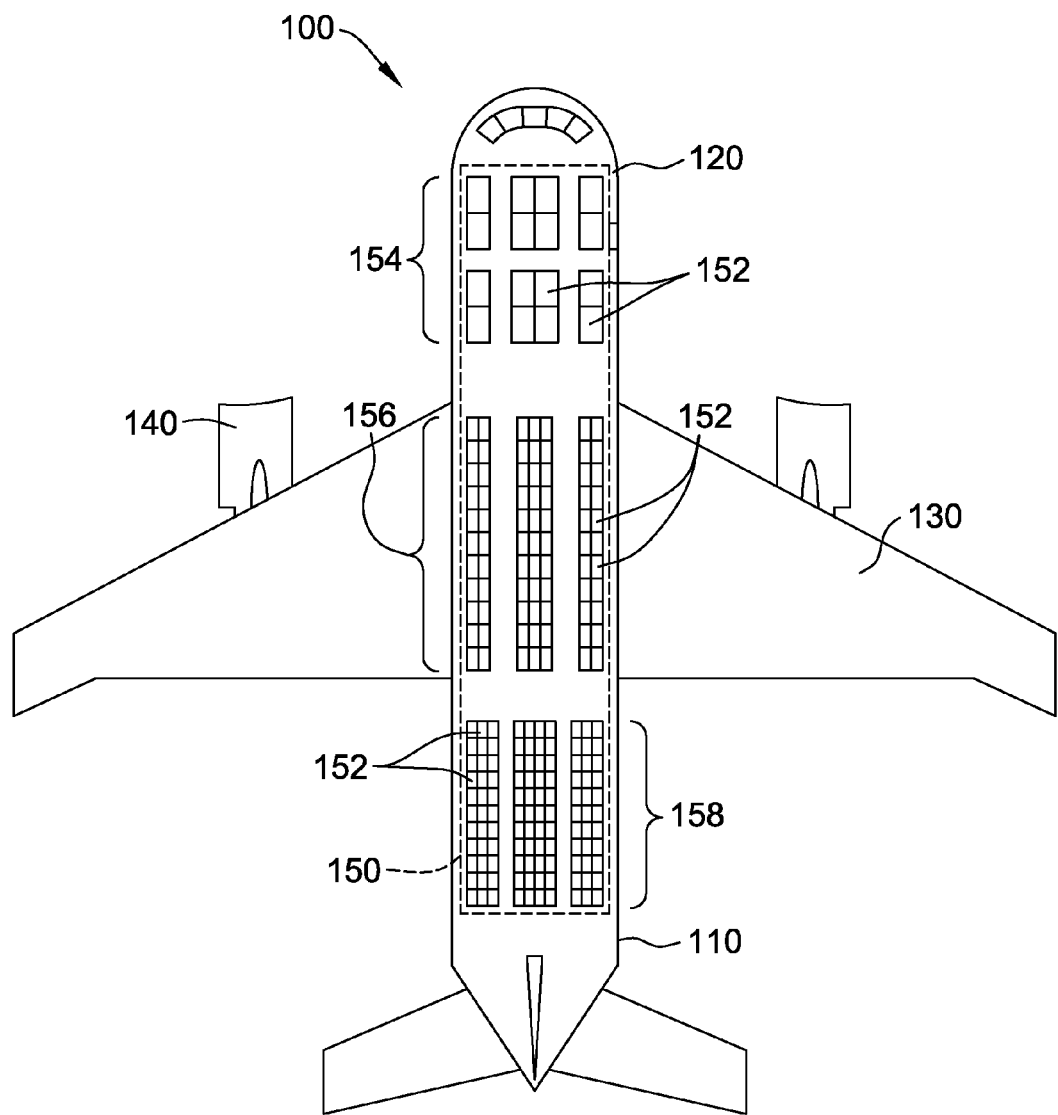
FIG. 1 is a plan view of an exemplary aircraft.

FIG. 1 is a plan view of an exemplary aircraft 100 including a body 110. In the exemplary embodiment, aircraft 100, may include, but is not limited to only including, airplanes, gliders, helicopters, and/or any other object that travels through airspace. Body 110 includes a fuselage 120 and a pair of wings 130 extending from fuselage 120. In the exemplary embodiment, at least one engine 140 is coupled to each wing 130 to provide thrust to aircraft 100. Aircraft 100 may include any number of engines 140 that enables aircraft 100 to function as described herein.

Included within fuselage 120 is a cabin 150 having a plurality of seats 152 for carrying passengers during travel. In some embodiments, cabin 150 is divided into sections or classes 154, 156, and 158. Seats 152 are arranged in rows and may be larger and have more space (e.g., legroom and seat width) depending on the section in which they are located. For example, seats 152 located in a first section 154, sometimes referred to as first class or business elite class, are the largest seats within aircraft 100. Likewise, seats 152 located in a second section 156, sometimes referred to as business class, are the second largest seats 152 within aircraft 100, and seats 152 located in a third section 158 are the smallest seats providing the least amount of space for each passenger. In some embodiments, seats 152 located in sections 154 and 156 are configured to fully recline to form a horizontal surface or bed, enabling a passenger to recline or lie down.

Figure 2:
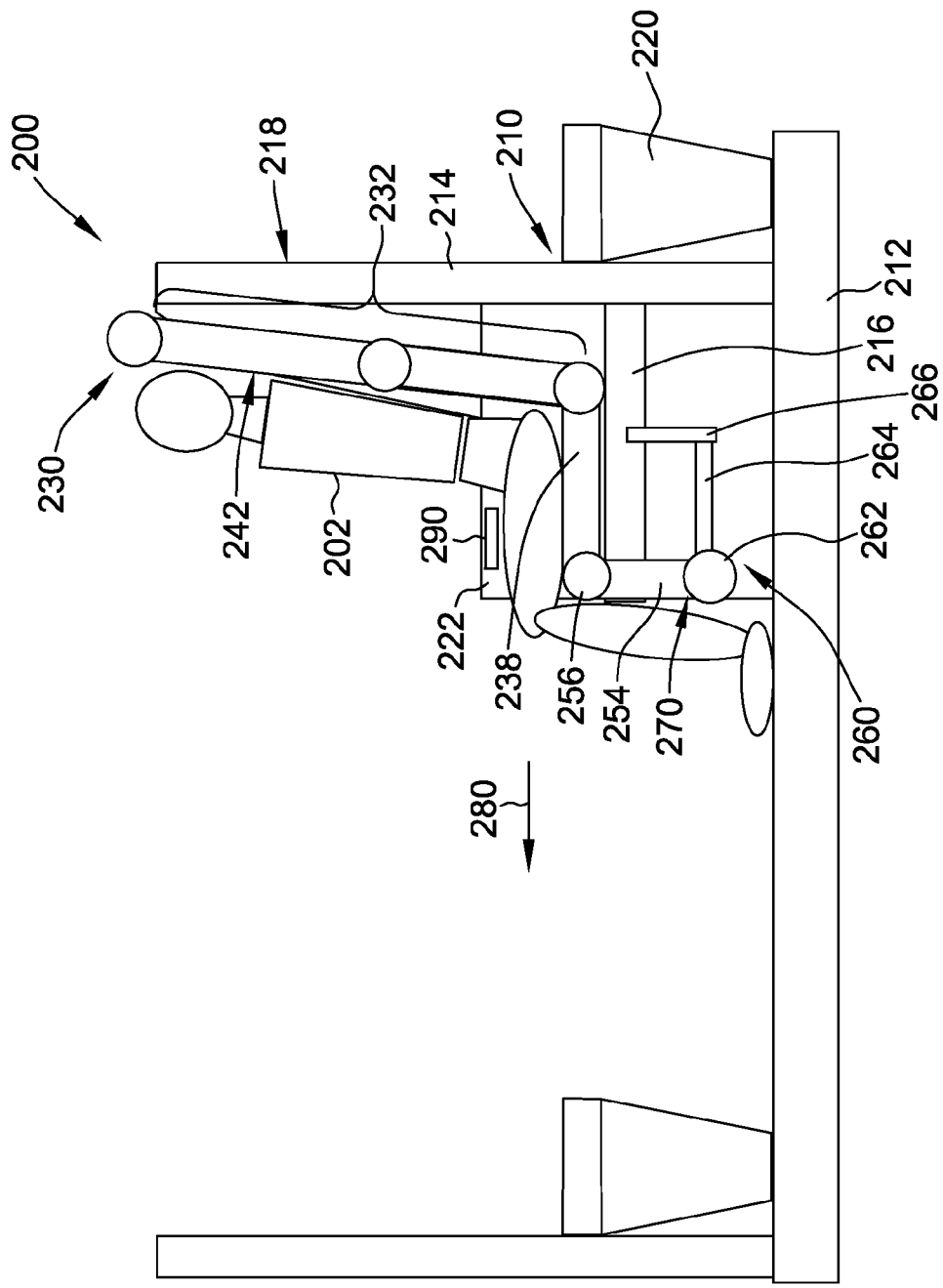
FIG. 2 is a cut-away side view of an exemplary chair, in a first position, for use with the aircraft shown in FIG. 1.
Figure 3:
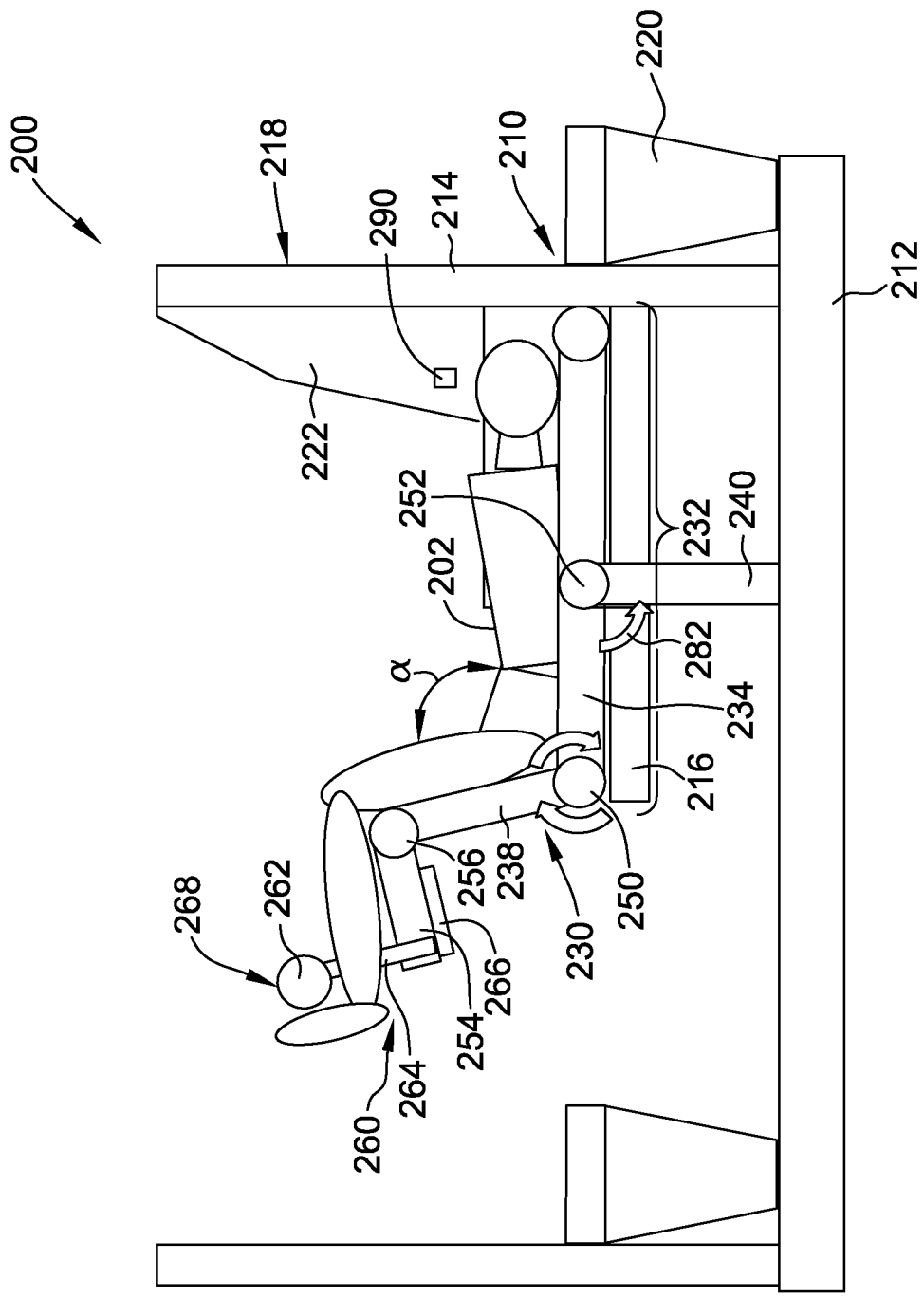
FIG. 3 is a cut-away side view of the chair shown in FIG. 2, in a second position.
Figure 4:
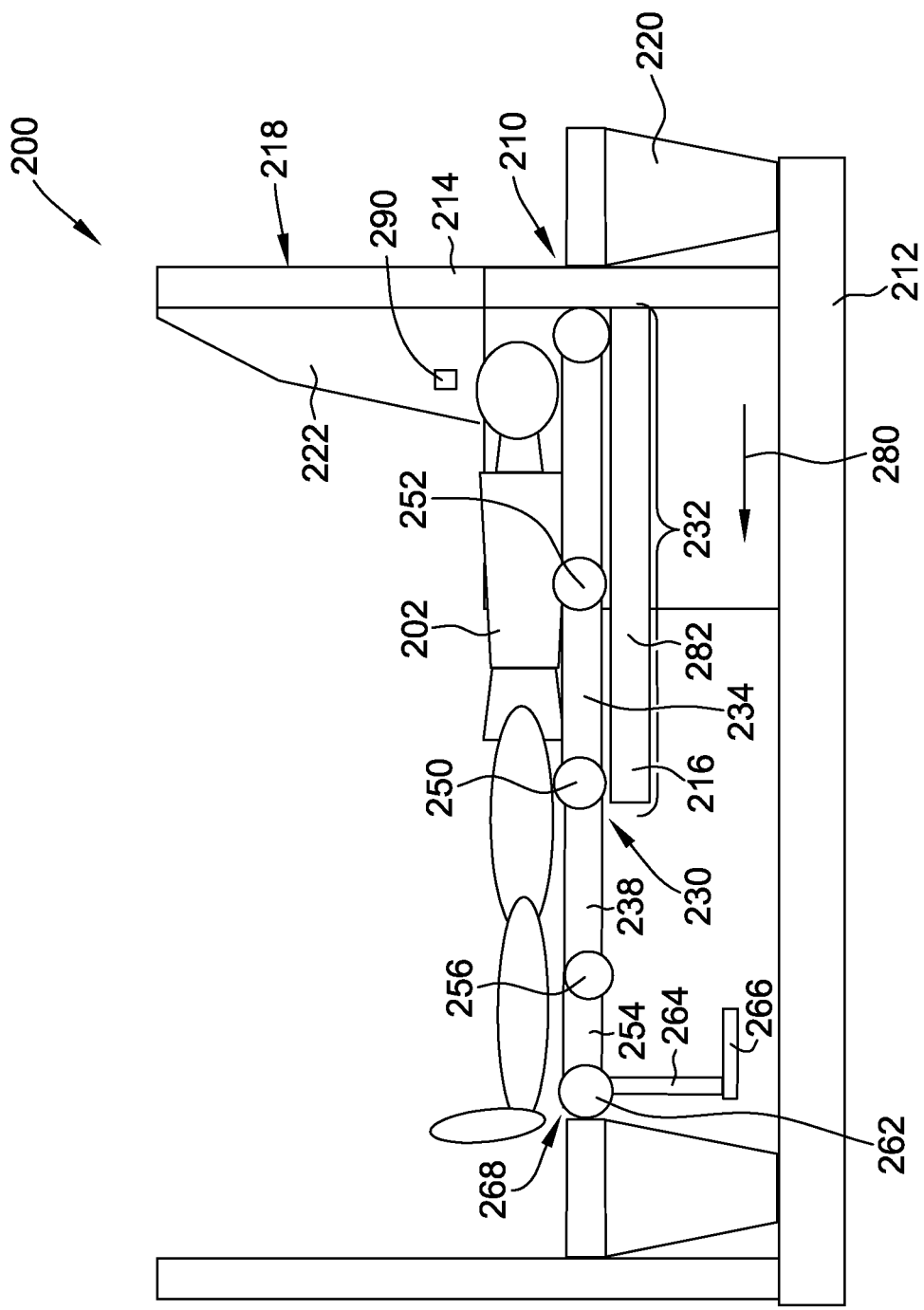
FIG. 4 is a cut-away side view of the chair shown in FIG. 2, in a third position.
Figure 5:
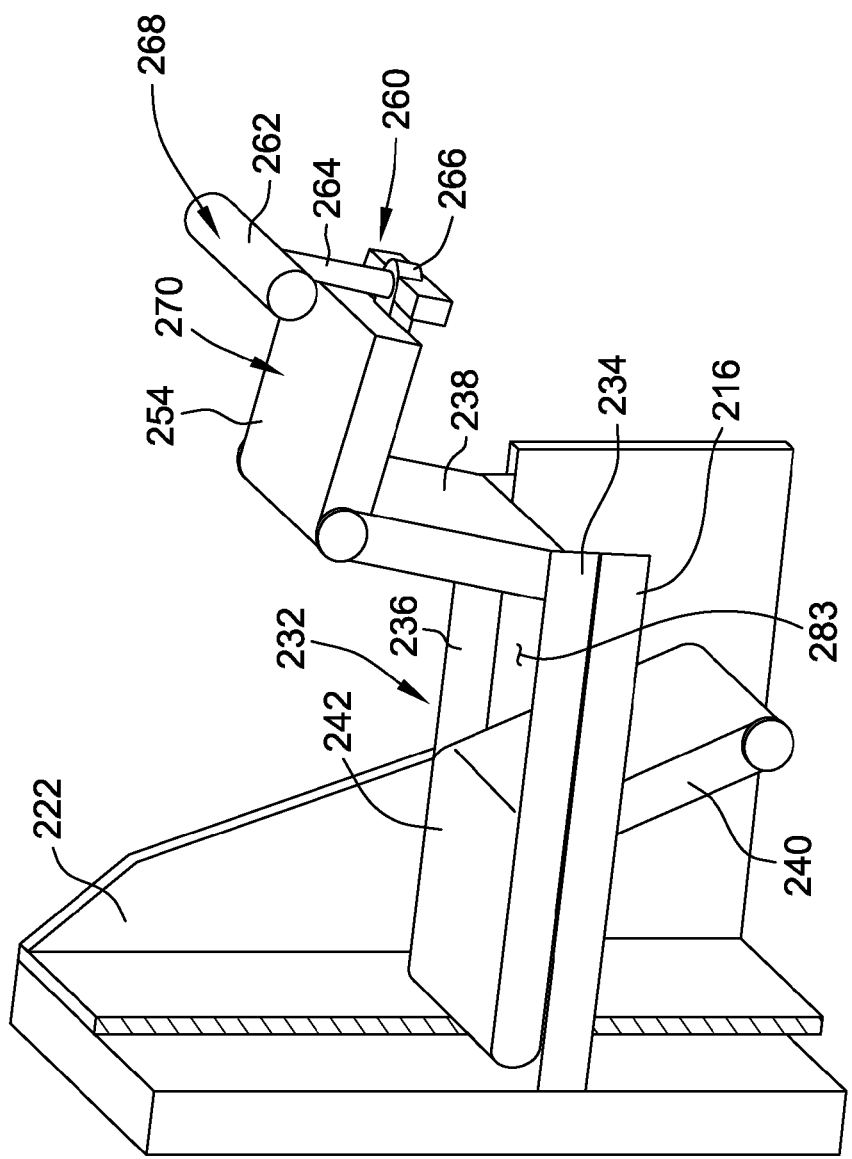
FIG. 5 is a cut-away perspective view of the chair shown in FIG. 2, in the second position.

FIGS. 2-4 are side cut-away views of an exemplary chair 200, such as seat 152 (shown in FIG. 1), for use within aircraft 100. FIG. 2 is shown with chair 200 in a first position, FIG. 3 is shown with chair 200 in a second position, and FIG. 4 is shown with chair 200 in a third position. FIG. 5 is a cut-away perspective view of chair 200 shown in FIGS. 2-4. For illustrative purposes, FIGS. 2-4 are shown with an exemplary user or passenger 202 utilizing chair 200.

In the exemplary embodiment, chair 200 includes a base 210 coupled to an aircraft floor 212. Base 210 includes a vertical chair support 214 and a horizontal chair support 216. Coupled to a backside 218 of vertical chair support 214 is a platform 220. In one embodiment, platform 220 is utilized by another passenger (not shown) behind passenger 202 as a workstation when chair 200 is in the first position and as an extension of a bed when chair 200 is in the third position. In some embodiments, an entertainment center (not shown) having a display device is coupled to backside 218 of vertical chair support 214 for use by another passenger (not shown) behind passenger 202. Additionally, privacy sidewalls 222 may be coupled to vertical chair support 214 and/or horizontal chair support 216.

In the exemplary embodiment, a chair assembly 230 is slidably coupled to base 210. Chair assembly 230 includes a support frame 232 having a first support member 234 and a second support member 236 (shown in FIG. 5). Coupled between first and second support members 234 and 236 is a seat 238, a lower back support 240, and an upper back support 242. Seat 238 is rotatably coupled to first and second support members 234 and 236 at seat pivot point 250. In the exemplary embodiment, lower back support 240 is hingedly coupled to support frame 232 at lower back pivot point 252 such that lower back support 240 is independently rotatable with respect to upper back support 242.

In the exemplary embodiment, a leg support 254 is hingedly coupled to seat 238 at a leg support pivot point 256 and a lower leg support 260 is coupled to leg support 254. In the exemplary embodiment, lower leg support 260 includes a foot retainer 262, a linking arm 264, and a back plate 266. Lower leg support 260 is positioned through leg support 254 such that a top surface 268 of foot retainer 262 is movable from a position that is substantially flush with a top surface 270 of leg support 254 to a position that substantially retains at least one of a foot, an ankle, and a lower leg of a passenger 202. In one embodiment, lower leg support 260 includes a locking device (not shown) that enables a passenger 202 to retain lower leg support 260 in a predetermined position. Additionally, lower leg support 260 is configured to move manually or automatically (described in more detail below) by passenger 202.

In the exemplary embodiment, at least a portion of seat 238, lower back support 240, upper back support 242, leg support 254 and foot retainer 262 are fabricated from a metal, plastic, and/or graphite composite and substantially covered with a cloth and padding material. Alternatively, seat 238, lower back support 240, upper back support 242, leg support 254 and foot retainer 262 can be fabricated from any material and covered with any material that enables chair 200 to support passenger 202 as described herein.

Referring to FIG. 2, in the exemplary embodiment, chair 200 is configured in a first position that enables passenger 202 to remain in a seated position. From the first position, chair assembly 230 can be moved in a direction 280 away from vertical chair support 214 and rotated to lie substantially parallel to horizontal chair support 216 or any reclined position therein between the fully upright position and the lie-flat position.

Referring to FIG. 3, in the exemplary embodiment, chair 200 is configured in a second position that enables passenger 202 to selectively stretch and/or bend a lower back and/or spine of passenger 202. In the second position, chair 200 enables passenger 202 to lie in a substantially horizontal position. Seat 238 is rotated, by passenger 202, with respect to chair assembly 230. In the exemplary embodiment, an angle a is formed between seat 238 and chair assembly 230. Seat 238 is configured to rotate in a predetermined range enabling passenger 202 to provide self-therapy. In some embodiments, seat 238 is configured to be rotated allowing angle a to range from slightly greater than 90° (first seat position) to 180° (third seat position shown in FIG. 4.). Alternatively, angle a can be any angle that facilitates supporting passenger 202 as described herein.

Figure 6:
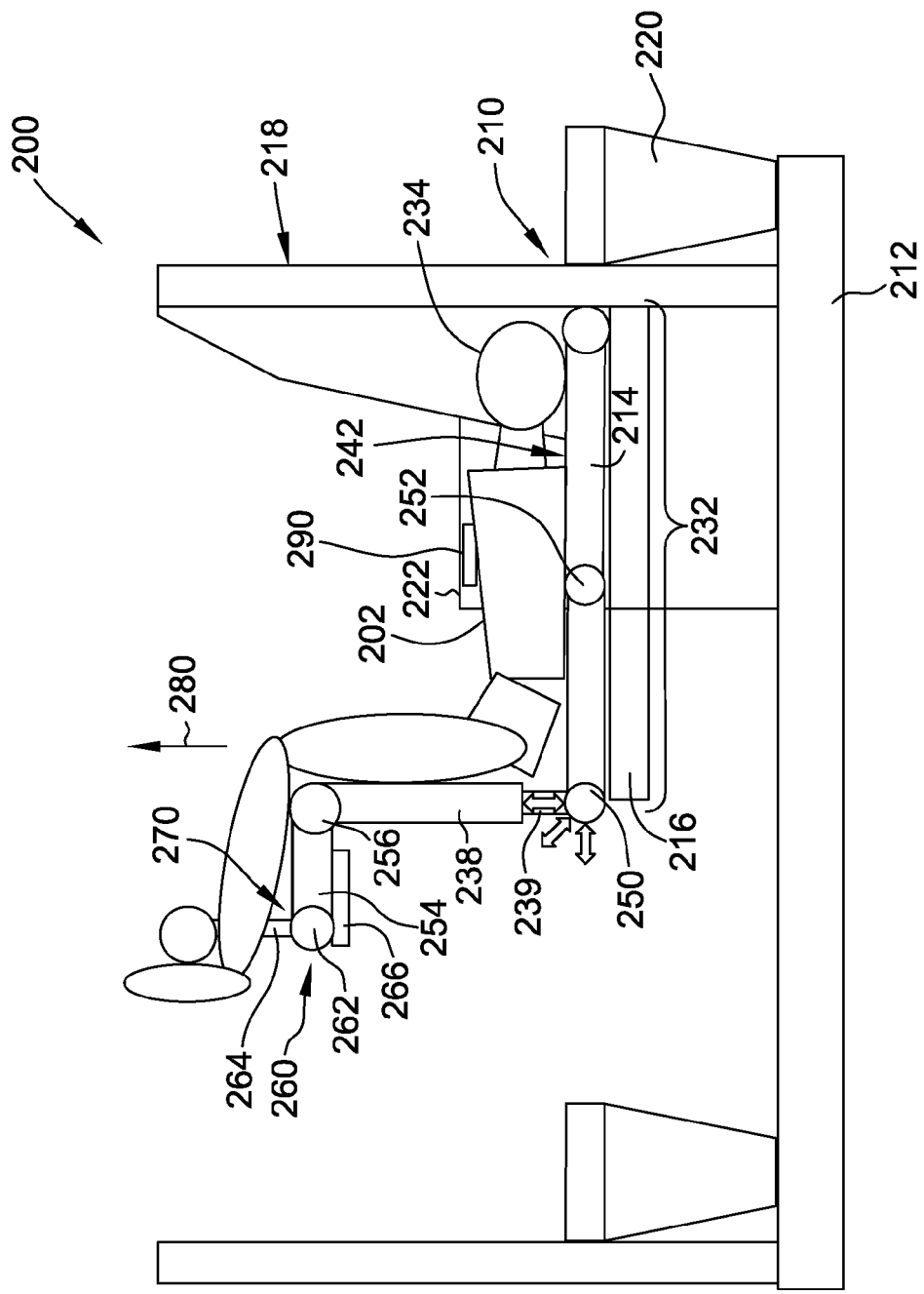
FIG. 6 is a cut-away perspective view of the chair shown in FIG. 2, in the second position with a seat extended from a chair assembly.

In one embodiment, as shown in FIG. 6, seat 238 is configured to mechanically extend along side-rails 239 relative to chair assembly 230 at seat pivot point 250. Seat 238 is configured to extend from chair assembly 230 in a plurality of directions such as vertically, horizontally, and obliquely. The extension of seat 238 from chair assembly 230 enables a passenger to lift the hips of the passenger away from the underlying surface, such as lower back support 240 to bend and/or stretch the lower back and/or spine of the passenger.

In one embodiment, seat 238 is manually rotated by passenger 202. Alternatively, seat 238 is automatically rotated by use of a remote device (described in more detail below). Rotating seat 238 enables passenger 202 to stretch and/or bend their lower back while passenger 202 is lying supine on at least a portion of lower back support 240 and upper back support 242. The stretching and/or bending movements aid passenger 202 in bringing the upper portion of the legs away and towards the torso of the passenger while the shoulders remain pinned to the upper back support 242 by their weight and the seat's surface frictional elements. Such movements enable selective stretching and/or bending of a lower back and/or spine of passenger 202.

To provide additional selective stretching and/or bending of the lower back and/or spine of passenger 202, lower back support 240 is independently rotatable with respect to upper back support 242. In the exemplary embodiment, lower back support 240 is configured to be unlatched and allowed to swing down from lower back pivot point 252. This loss of lower back support for the passenger 202 while rotating the seat assembly to a reclined position results in a stretching and/or bending of the lower spine. Rotating lower back support 240 in a direction 282 towards floor 212 creates a void 283 in chair assembly 230 in which the lower back of passenger 202 may remain suspended (also shown in FIG. 5). As the lower back of passenger 202 is suspended, the body of passenger 202 is supported at least in part by upper back support 242, leg support 254, and lower leg support 260. Such a configuration enables gravity and leverage to relieve compressive forces imparted on the lower back and/or spine of passenger 202. Such a configuration may also stretch posterior back muscles of the lower back.

In one embodiment, lower back support 240 is configured to rotate towards passenger 202 substantially supporting the body of passenger 202 as the back and/or spine is arched in the supine position.

In one embodiment, lower back support 240 is manually rotated by passenger 202. Alternatively, lower back support 240 is automatically rotated by use of a remote device (described in more detail below). In some embodiments, back support 240 includes a locking device (not shown) that substantially prevents lower back support 240 from rotating.

Referring to FIG. 4, in the exemplary embodiment, chair 200 is configured in a third position that enables passenger 202 to lie substantially in a supine or prone position on chair 200. In such a configuration, seat 238, lower back support 240, upper back support 242, leg support 254 and lower leg support 260 extend from vertical chair support 214 to platform 220 of an adjacent chair. The third position of chair 200 enables chair to lie substantially flat by chair assembly 230 sliding and/or moving along horizontal support chair support 216 and such that chair 200 lies substantially parallel to horizontal chair support 216.

In the exemplary embodiment, any or all portions of chair 200 including seat 238, lower back support 240, upper back support 242, leg support 254 and lower leg support 260, may be moved by a user utilizing remote device 290. In some embodiments, remote device 290 is a computing device including at least one memory device and processor that is coupled to memory device for executing instructions. In the exemplary embodiment, computing device performs one or more operations described herein by programming processor. For example, the processor may be programmed by encoding an operation as one or more executable instructions and by providing the executable instructions in the memory device.

In the exemplary embodiment, remove device 290 also includes a communication interface coupled to the processor. The communication interface communicates with a user locally or remotely to command chair 200. To communicate with chair 200, the communication interface may include, for example, a wired adapter, a wireless adapter, and/or a mobile telecommunications adapter. In some embodiments, remote device is configured to control an entertainment center coupled to chair 200.

Figure 7:
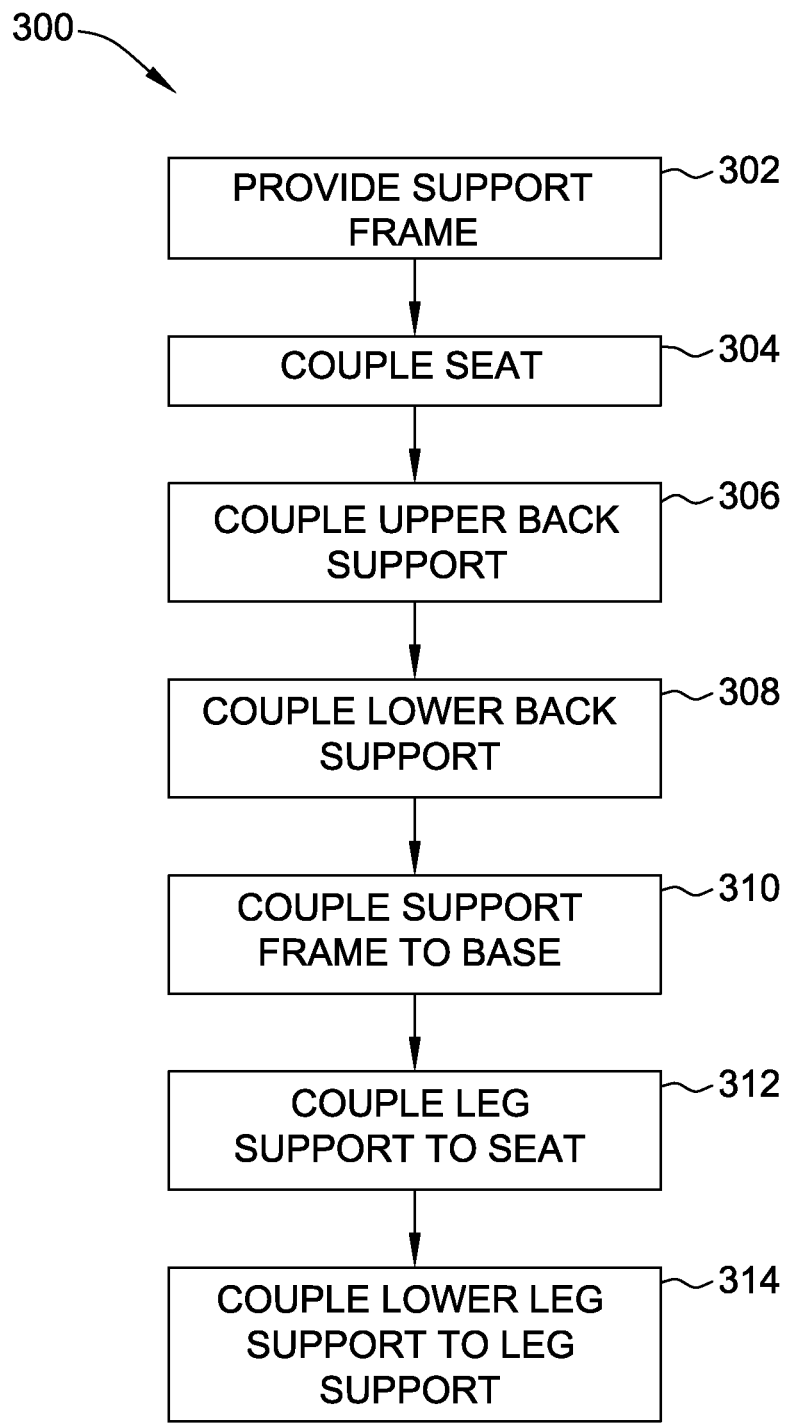
FIG. 7 is a flowchart of an exemplary method that may be implemented to fabricate the chair shown in FIG. 2.

FIG. 7 is a flowchart of an exemplary method 300 that may be implemented to fabricate chair 200 (shown in FIG. 2). In the exemplary embodiment, support frame 232 is provided 302 and seat 238 is coupled 304 to support frame 232. Method 300 also includes coupling 306 upper back support 242 to support frame 232 and coupling 308 lower back support 240 to support frame 232, such that lower back support 240 is independently rotatable with respect to upper back support 242. In the exemplary embodiment, support frame 232 is coupled 310 to base 210 and in some embodiments, support frame 232 is slidably coupled 310 to base 210. Leg support 254 is hingedly coupled 312 to seat 238 and lower leg support 260 is coupled to leg support 254.

The embodiments described herein relate generally to a self-therapeutic chair for use in a vehicle. The embodiments described herein enable a passenger to stretch at least one of a lower back and/or a spine of the passenger while in the chair. Stretching while in the chair may enable a passenger to relieve compressive forces and stress on the lower back and/or spine during travel. The stretching may also enable a passenger to feel revitalized and less dehydrated after travel which can increase a passenger's positive attitude towards travel. The stretching that is enabled by the embodiments described herein may also flush toxic biochemicals from sore muscle areas unreachable by direct massage.

Exemplary embodiments of methods and systems for are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A chair for use with a vehicle, said chair comprising:
   a base; and
   a chair assembly slidably coupled to said base and configurable between an upright position and a reclined position, said chair assembly comprising:
      a support frame comprising a first end and a second end opposite from said first end;
      a seat comprising a first seat end rotatably coupled to said second end of said support frame;
      an upper back support comprising a first upper back support end and a second upper back support end, said first upper back support end coupled to said first end of said support frame, said second upper back support end coupled to said support frame at a distance away from said first end of said support frame; and
      a lower back support comprising a first lower back support end and a second lower back support end, said first lower back support end rotatably coupled to said support frame at said second upper back support end, said lower back support being independently rotatable relative to said seat and said upper back support about a pivot point defined at said first lower back support end such that:
         when said chair assembly is in the upright position, said support frame is substantially vertically-aligned and said lower back support is aligned substantially parallel with said upper back support along said support frame; and
         when said chair assembly is in the reclined position, said support frame is substantially horizontally-aligned and said second lower back support end rotates about said pivot point and separates from said support frame to create a void between said upper back support and said seat in a space occupied by said lower back portion prior to rotation.

2. The chair according to claim 1, wherein said base further comprises a vertical chair support and a horizontal chair support.

3. The chair according to claim 1, wherein said chair assembly further comprises:
  a leg support hingedly coupled to said seat; and
  a lower leg support coupled to said leg support.

4. The chair according to claim 3, wherein said seat is configured to rotate between a first position and a second position.

5. The chair according to claim 4, wherein said lower leg support includes a foot retainer slidably coupled to said leg support, said foot retainer adapted to retain at least one of a foot, an ankle, and a lower leg of a user when said seat is in the second position.

6. The chair according to claim 1, wherein said lower back support is further configured to move at least one of towards said seat and away from said seat to at least one of selectively stretch and bend a spine of a user.

7. The chair according to claim 1, wherein said chair assembly is configured to extend from said base to an adjacent chair to lie substantially flat.

8. A chair for use with a vehicle, said chair comprising:
  a base; and
  a chair assembly slidably coupled to said base, said chair assembly comprising:
    a support frame comprising a first end and a second end opposite from said first end;
    at least one side rail comprising a first side rail end and a second side rail end opposite from said first side rail end, said first side rail end rotatably coupled to said second end of said support frame;
    a seat coupled to said at least one side rail, wherein said seat is configured to selectively extend along said at least one side rail toward or away from said support frame and selectively rotate about said second end of said support frame;
    an upper back support comprising a first upper back support end and a second upper back support end, said first upper back support end coupled to said first end of said support frame, said second upper back support end coupled to said support frame at a distance away from said first end of said support frame; and
    a lower back support comprising a first lower back support end and a second lower back support end, said first lower back support end rotatably coupled to said support frame at said second upper back support end,
    wherein said second lower back support end rotates away from said support frame and away from said seat.

9. The chair according to claim 8, wherein said base further comprises a vertical chair support and a horizontal chair support.

10. The chair according to claim 8, wherein said chair assembly further comprises:
  a leg support hingedly coupled to said seat; and
  a lower leg support coupled to said leg support.

11. The chair according to claim 8, wherein said chair assembly is configured to enable a user to remain in a seated position when said chair assembly is in a first position.

12. The chair according to claim 10, said lower leg support includes a foot retainer slidably coupled to said leg support, said foot retainer adapted to retain at least one of a foot, an ankle, and a lower leg of a user when said chair assembly is in a second position.

13. The chair according to claim 8, wherein said lower back support is further configured to move at least one of towards said seat and away from said seat to at least one of selectively stretch and bend a spine of a user when said chair assembly is in the second position.

* * * * *

UNITED STATES PATENT AND TRADEMARK OFFICE
CERTIFICATE OF CORRECTION

PATENT NO. : 9,493,100 B2  Page 1 of 1
APPLICATION NO. : 13/953187
DATED : November 15, 2016
INVENTOR(S) : Joseph Wilbur Evans It is certified that error appears in the above-identified patent and that said Letters Patent is hereby corrected as shown below:

In the Specification

In Column 4, Line 18, delete "angle a" and insert therefor -- angle $\alpha$ --.

In Column 4, Line 22, delete "angle a" and insert therefor -- angle $\alpha$ --.

In Column 4, Line 24, delete "angle a" and insert therefor -- angle $\alpha$ --.

Signed and Sealed this
Twenty-eighth Day of February, 2017

Michelle K. Lee
*Director of the United States Patent and Trademark Office*